United States Patent [19]
Williams

[11] 4,418,982
[45] Dec. 6, 1983

[54] SPLICE ORGANIZER

[75] Inventor: Gary S. Williams, Vancouver, Canada

[73] Assignee: Phillips Cables Ltd., Ontario, Canada

[21] Appl. No.: 235,235

[22] Filed: Feb. 17, 1981

[51] Int. Cl.³ .............................................. G02B 7/26
[52] U.S. Cl. ................................ 350/96.20; 211/208; 248/544
[58] Field of Search .............. 350/96.20, 96.21, 96.22; 312/126, 306; 248/243, 544, 407; 211/47, 71, 113, 128, 174, 207, 208; 156/502

[56] References Cited
U.S. PATENT DOCUMENTS

| | | | |
|---|---|---|---|
| 4,171,867 | 10/1979 | Cocito | 350/96.21 |
| 4,266,853 | 5/1981 | Hutchins et al. | 350/96.20 |
| 4,319,951 | 3/1982 | Korbelak et al. | 156/502 |
| 4,332,435 | 6/1982 | Post | 350/96.20 |

FOREIGN PATENT DOCUMENTS

| | | | |
|---|---|---|---|
| 2363243 | 3/1978 | France | 350/96.21 |
| 55-62414 | 5/1980 | Japan | 350/96.20 |

*Primary Examiner*—John D. Lee
*Attorney, Agent, or Firm*—Townsend and Townsend

[57] ABSTRACT

A splice organizer useful in fibre optics. The organizer has plates and each plate receives a length of fibre having a splice formed in it. The fibre lengths are retained on each plate. There are suspension points on each plate. A chassis of spaced side members and cross members extending between the side members is positioned to receive the suspension points on the plates. The organizer is relatively cheap to make and easy and efficient to use.

7 Claims, 2 Drawing Figures

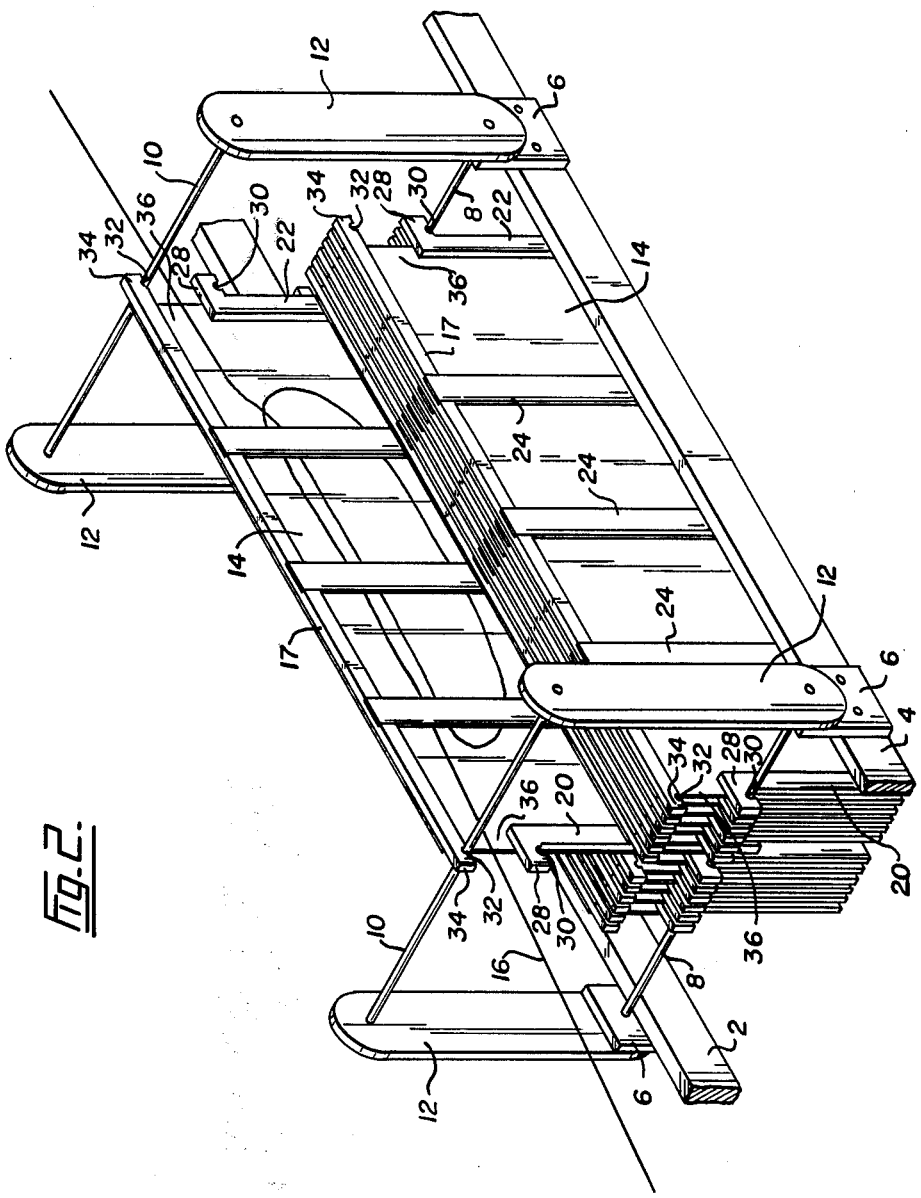

SPLICE ORGANIZER

FIELD OF THE INVENTION

This invention relates to a holder for holding a plurality of lengths of spliced fibre and is of particular application in the holding of spliced optical fibres.

DESCRIPTION OF THE PRIOR ART

When splicing optical fibres by fusion it is necessary to have enough slack fibre so that the fibre can be pulled out of the spliced case and into the splicing machine. This requires up to ½ meter of fibre from each cable to be stored in the splice case when the case is sealed, that is when the splicing has been completed. For a multifibre cable there must be a method of storing this slack, of protecting the relatively weak splice and keeping the fibres separate from each other. If a splice breaks or if it is necessary to change which fibres are spliced together each splice should be accessible by manipulating only one spliced fibre.

SUMMARY OF THE INVENTION

The present invention accordingly seeks to provide a splice holder that may also be described as a splice organizer in that it permits working on one spliced fibre, or the production of one splice, at one time and in which each splice is protected by an individual plate. Each plate may be lifted up, supported in a raised position and the splice carried by the one plate can then be worked on. The other lengths of spliced fibre are unaffected and, in particular, undisturbed.

Accordingly, in its broadest aspect the present invention is a splice organizer useful particularly in fibre optics and comprising a plurality of plates, each plate adapted to receive a portion of fibre having a splice formed on it; retaining means for the fibre portion on each plate, first suspension means on the plate, a chassis comprising spaced side members and first cross members extending between the side members and positioned to receive the first suspension means on the plates.

In a preferred embodiment the plates are each provided with second suspension means and the chassis is provided with second cross members so that the plates can be lifted up, usually one at a time, and supported in the raised position on the second cross members. It is desirable that these second cross members be pivotable so that they are only pivoted to the upper position when it is required to work on a splice.

BRIEF DESCRIPTION OF THE DRAWINGS

Aspects of the invention are illustrated, merely by way of example, in the accompanying drawings in which:

FIG. 2 illustrates a modification of the holder of FIG. 1.

DESCRIPTION OF THE PREFERRED EMBODIMENTS

Figure 1:
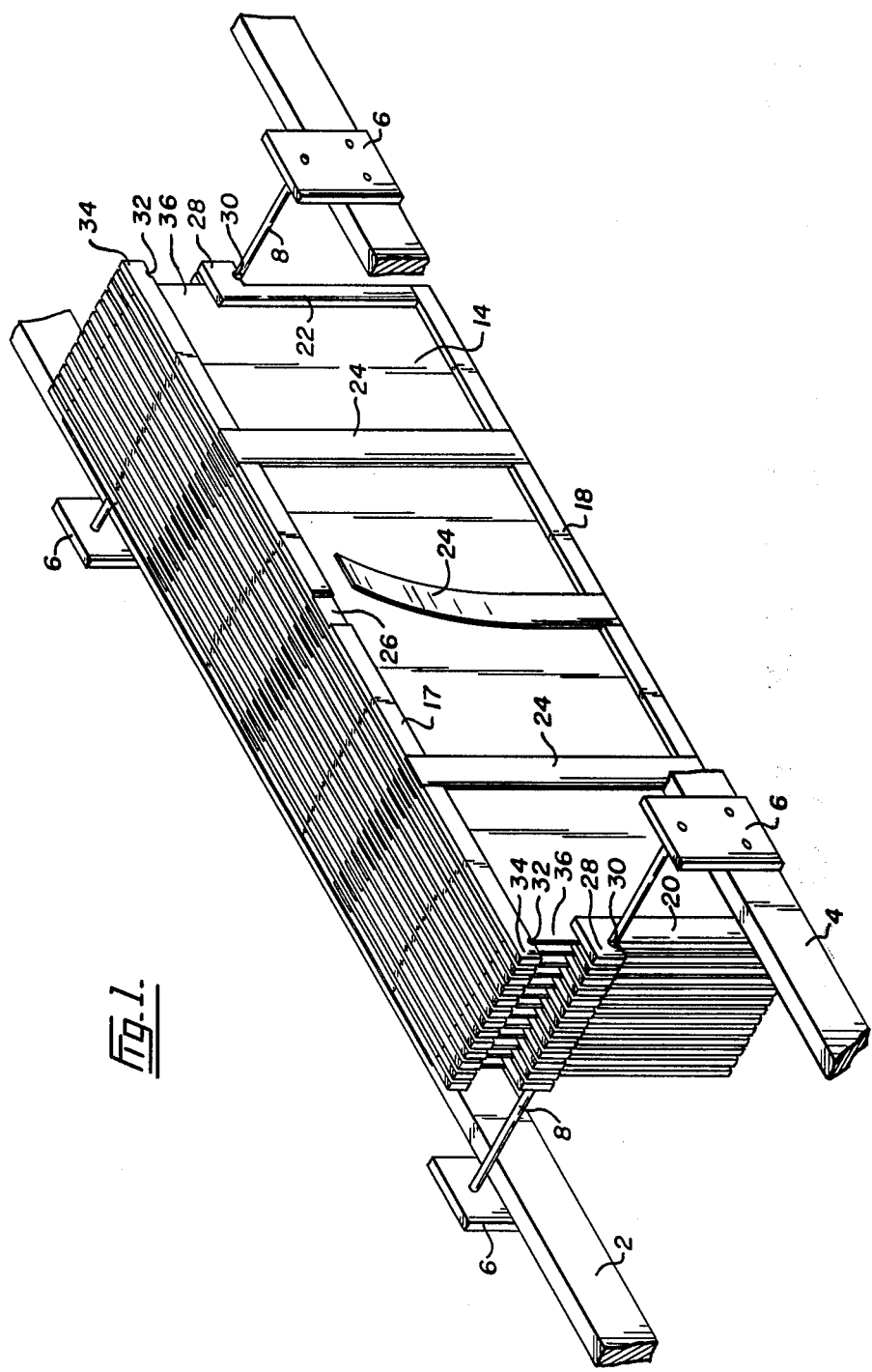
FIG. 1 is a perspective view of a splice holder according to the present invention.

The drawings show a splice holder comprising a chassis defined by side members 2 and 4 spaced from each other. There are plates 6 attached to each side member and first cross members 8 extend between the plates 6, across the chassis. The first cross members 8 are desirably threaded at each end and engage threaded recesses in plates 6 to hold the splice holder together.

As shown in FIG. 2 there are second cross members 10 attached to extensions 12 and the second cross members 10 are positioned above the first cross members 8. It is desirable that the second cross members 10 be pivotally attached as the second cross members 10 are only used when a splice is being worked on. They can thus be pivoted to lie flat when it is not required to work on a splice.

There are a plurality of plates 14 received between the side members 2 and 4 of the chassis. As shown in FIG. 2, where one of the plates 14 is raised, a length of fibre 16 is supported on the plate. In the preferred embodiment illustrated the plate 14 has a raised periphery at the top 17, bottom 18 (see FIG. 1) and two sides 20 and 22 and, as shown in FIG. 1, there are flexible members 24 attached, for example by gluing, to the bottom peripheral member 18 and adapted to be received in small recesses 26 in the upper member 17. These flexible members 24 resile to the position shown in FIG. 2 where they hold the length of fibre 16 in position on the plate. But, as shown in FIG. 1, they can be moved away from the plates 14 to locate the fibre 16 in position.

There are first suspension means at each end of each plate 14 so that a plate may be suspended from the first cross members 8. As illustrated in FIG. 1 these first suspension means may comprise small projections 28 desirably provided with recesses 30 that are a close fit on the cross member 8. These suspension means are formed at each end of the plate 14. There are second suspension means positioned directly above the first suspension means and comprising recesses 32 formed on small extensions 34 of the upper peripheral member 17. As particularly illustrated in FIG. 2 the arrangement is such that the plates 14 for the splice to be worked on can be raised and supported on the second cross members 10 while work is carried out. It is desirable to provide breaks 36 in the periphery, as shown in both drawings, so that the length of fibre can pass to the central, recessed area of the plate 14 and not be compressed by having to pass over the raised periphery.

The rest position of the fibre support is shown in FIG. 1, that is the plates 14 are supported on the first cross members 8. However, when it is desired to work on one splice then the plate 14 carrying that splice is raised as shown in FIG. 2, the second cross members 10 are pivoted from the rest positions to the positions shown in FIG. 2 and the plate 14 is then suspended by the recesses 32 in the top peripheral strip 17. The fibre length is removed by easing the flexible strips 24 away from the plate 14 and removing the fibre 16 located on the plate 14. This allows working of the device, for example in a splicing machine, without disturbing any other splice in the support.

The device according to the present invention is relatively cheap and easy to make and yet provides an excellent means of protecting each splice in a fibre, particularly in optical fibre, from stress. It is desirable to make the material of plastic, for example acrylate plastics have proved ideal. The plates 14 may be made of quite thin acrylate plastic as the raised periphery provides considerable mechanical support for the relatively thin plates. Acrylate plastics have the advantage of transparency so that a splice can be inspected without moving the plates 14.

I claim:

1. A splice holder comprising:

a chassis defined by side members spaced from each other, first cross members raised above the side members and spaced from each other and second cross members positionable above the first cross members;

a plurality of plates to be received between the side members of the chassis and to receive a length of fibre containing a splice;

retaining means associated with each plate to hold a length of spliced fibre against the plate;

first suspension means at each end of each plate so a plate may be suspended from the first cross members of the chassis to lie substantially vertically in a first position;

second suspension means at each end of each plate so each plate can be suspended from the second cross members to lie substantially vertically in a second position, above the first position;

a raised periphery for each plate to protect a length of fibre held against the plate by the retaining means; and at least one break in the periphery to permit the fibre to pass through the periphery.

2. A holder as claimed in claim 1 in which the second cross members are pivotally mounted so that they may be pivoted from a rest position, where they cannot support the plates, to a useful position where they stand above the first cross members to permit suspension of the plates.

3. A holder as claimed in claim 1 in which there are breaks at each end of the periphery of each plate.

4. A splice holder as claimed in claim 1 in which each plate comprises a flat, transparent plastic sheet.

5. A splice holder as claimed in claim 1 in which the retaining means comprises flexible strips attached to the bottom periphery of each plate and extending across the plate to act as retaining means for the length of spliced fibre on the plate.

6. A splice holder as claimed in claim 5 in which the upper periphery of each plate is formed with small recesses to receive the free ends of the flexible strips.

7. A splice holder as claimed in claim 1 in which the upper periphery of each plate is formed by an upper peripheral portion extending along the upper edge of the plate and slightly beyond the ends of the plate;

indents to act as the second suspension means formed on the underside of the upper peripheral portion where it extends beyond the ends of the plate; the periphery at each side of the plate stopping short of the upper peripheral portion to form an inlet at one end and an outlet at the other end of the plate for the fibre; and indents to act as the first suspension means formed on each side periphery.

* * * * *